United States Patent [19]

Kale

[11] 4,032,455
[45] June 28, 1977

[54] TRAPS FOR SINKS, LAUNDRY TUBS AND THE LIKE

[76] Inventor: Howard D. Kale, 6529 Gulfside Drive, Longboat Key, Fla. 33577

[22] Filed: June 14, 1976

[21] Appl. No.: 696,071

[52] U.S. Cl. .............................. 210/435; 210/447; 137/247.51; 138/92
[51] Int. Cl.² ........................................ B01D 29/36
[58] Field of Search ............... 137/247.41, 247.51; 138/92; 210/167, 170, 305, 320, 435, 441, 447

[56] References Cited

UNITED STATES PATENTS

| 861,493 | 7/1907 | Bell | 210/447 |
|---|---|---|---|
| 1,217,763 | 2/1917 | Hirrich | 137/247.41 X |
| 1,817,376 | 8/1931 | Izquierdo | 210/447 |
| 3,904,523 | 9/1975 | Sierzega | 210/447 X |
| 3,935,602 | 2/1976 | Kale | 210/435 X |

*Primary Examiner*—Harold W. Weakley

[57] ABSTRACT

A trap for use with waste water lines for sinks, laundry tubs and the like has a dip portion for retaining liquids to prevent the reverse flow of noxious gases. The lower wall of the dip portion has an opening which is smaller than the interior diameter of the trap and which is adapted to receive a closure plug. A plug for closing the opening is arranged to support a blocking member in the interior of the dip portion of the trap. The blocking member comprises a plurality of flexible fingers which are held in spaced apart relationship on a toroid such that the exterior surfaces of the fingers taper outwardly from the supporting toroid to dimension such that the fingers in combination form a circle which approximates the interior diameter of the trap and the fingers then taper inwardly until the tips of the fingers in combination define a circle of approximately the same dimension as the toroid. The flexible fingers permit the blocking member to be inserted in the trap through the relatively small opening in the dip portion. When in place within the trap, the fingers flex outwardly and the blocking member substantially covers the cross section of the trap in a plane perpendicular to the direction of liquid flow.

3 Claims, 2 Drawing Figures

TRAPS FOR SINKS, LAUNDRY TUBS AND THE LIKE

FIELD OF INVENTION

This invention relates to improved blocking members for traps for waste liquid lines.

BACKGROUND OF INVENTION

In my U.S. Pat. application Ser. No. 498,071 filed Aug. 16, 1974, I have shown an improved plug for closing the clean out opening in the dip portion of a trap for use in liquid waste lines of sinks, laundry tubs and the like. The improved plug has a plurality of blocking fingers arranged in a pattern on the plug such that foreign objects are blocked from flowing through the trap for all rotational orientations of the plug. The clean out opening in such prior art sink traps is small compared to the interior diameter of the trap.

SUMMARY OF INVENTION

In accordance with my invention a blocking member of a trap used with sinks, laundry tubs and the like comprises a plurality of flexible fingers held in spaced apart relation on a toroid such that the exterior surfaces of the fingers taper outwardly from the supporting toroid to a dimension that the surfaces of the fingers in combination define a circle that approximates in diameter the interior diameter of the trap at the point of insertion of the blocking member, the fingers then taper inwardly until the surfaces of the tips thereof in combination define a circle of approximately the same dimension as the supporting toroid. The toroid may be inserted in a recess in a plug adapted to close the opening or alternatively the toroid may be formed as an integral part of the closure plug.

Advantageously, the flexible fingers permit the blocking member to be inserted into and removed from the trap through the small clean out opening and to substantially fill the inside diameter of the trap when in place. Furthermore, since the flexible fingers are mounted on a toroid, the blocking efficiency of the blocking member is independent of rotational orientation in the dip portion of the trap.

BRIEF DESCRIPTION OF DRAWING

My invention will be fully understood and appreciated from the following detailed description when read with reference to the drawing in which.

DETAILED DESCRIPTION

Figure 1:
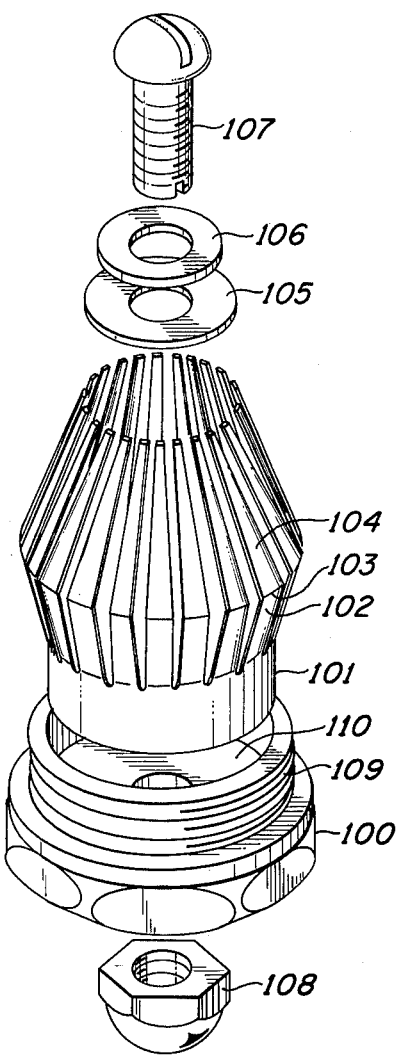
FIG. 1 is an exploded perspective view of a closure plug and a blocking member.

In my U.S. Pat. application Ser. No. 498,071 filed Aug. 16, 1974, there is shown conduit formed to provide a trap comprising an input portion for connection to a sink, laundry tub or the like, an output portion for connection to an angular pipe which typically runs horizontally to a vertical waste line and a dip portion for retaining waste liquid and thus serving to block the return of noxious gases to the sink or laundry tub. In that prior application there is shown an opening in the bottom wall of the dip portion of the trap and a plug which is adapted to close the opening. A typical prior art trap is shown in FIG. 2. as comprising an input portion 201, an output portion 202 and an intervening dip portion 203. In the bottom wall of the dip portion 203 there is a downward depending circular wall 204 which forms an opening to receive the plug 100. In in the illustrative embodiment of FIG. 1 and FIG. 2, the plug 100 has external threads 109 and the opening has internal threads 205.

Figure 2:
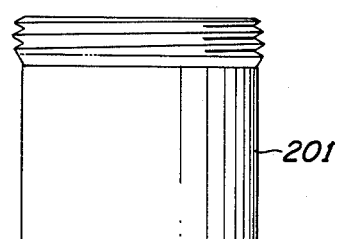
FIG. 2 shows the plug and blocking member of FIG. 1 in place in the dip portion of a trap for liquid waste lines.
Figure 2:
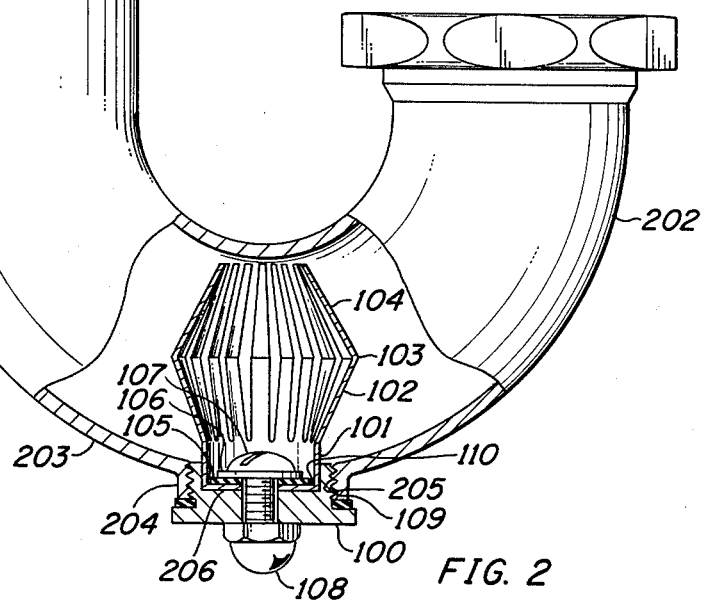

In illustrative embodiment of the blocking member shown in FIG. 1 in exploded perspective view, the blocking member is constructed separate and apart from the plug 100. This is but a design choice and such a blocking member can be formed integrally with the plug 100 without departing from teachings of this invention.

The blocking member comprises the supporting toroid 101, plurality of flexible fingers 102 which taper outwardly to the point labelled 103 and then taper inwardly to the point labelled 104. In the illustrative embodiment as shown in the drawing, the blocking member comprises a floor 206 which is attached to the toroid 101 and which has a hole to receive bolt 107. The bolt 107, the washer 106, the resilient washer 105 and the nut 108 serve to hold the blocking member in place in the plug recess 110 in the plug 100. The flexible fingers 102 at their dimension marked by the point labelled 103, in combination define a circle having a diameter which approximates the interior diameter of a conduit which forms the trap. The tips of the fingers at the dimension labelled 104 define a circle having a diameter approximately equal to the diameter of the toroid 101. The double taper of the flexible fingers 102 permits the blocking member to be readily inserted through the relatively small opening in the bottom wall of the trap and to be removed therefrom for cleaning. That is, the flexible fingers 102 flex at their point of junction with the supporting toroid 101 and along their length bring the insertion and removal of the blocking member through the opening in the bottom of the trap.

What is claimed is:

1. A blocking member for a trap for use in connection with sinks, laundry tubs and the like, said trap having a dip portion with the bottom wall of said dip portion having an opening, and a plug for closing said opening; said blocking member comprising a supporting toroid adapted to be received by said plug, plurality of flexible fingers vertically depending from and held in spaced apart relationship on said toroid each of said flexible fingers tapering outwardly from said supporting toroid to a point chosen such that corresponding positions on said plurality of flexible fingers define a circle having a diameter corresponding approximately to the interior diameter of a trap and tapering inwardly from that point to a dimension such that the tips of the plurality of flexible fingers in combination define a second circle having a diameter approximately equal to the diameter of said supporting toroid, and means for attaching said blocking means to said plug.

2. A blocking member in accordance with claim 1 wherein supporting toroid comprises a ring for supporting said fingers and a floor surface for attaching said toroid to said plug.

3. A blocking member in accordance with claim 1 wherein the height of said blocking member as measured along a straight line from the point of support of said fingers on said ring to said tips of said fingers corresponds approximately to said interior diameter of a trap.

* * * * *